(12) United States Patent
Lin et al.

(10) Patent No.: US 6,310,410 B1
(45) Date of Patent: Oct. 30, 2001

(54) METHOD AND APPARATUS FOR REDUCING SOURCE VOLTAGE DEVIATION IN HOT PLUG APPLICATIONS

(75) Inventors: Feng Lin, Plano; Heping Dai; David G. Daniels, both of Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/637,548

(22) Filed: Aug. 11, 2000

Related U.S. Application Data

(60) Provisional application No. 60/159,500, filed on Oct. 15, 1999.

(51) Int. Cl.[7] .................................................. H02H 3/00
(52) U.S. Cl. ........................ 307/119; 307/135; 307/147; 361/58; 710/103
(58) Field of Search .................................... 307/134, 119, 307/135, 147; 361/58; 710/103; 439/60

(56) References Cited

U.S. PATENT DOCUMENTS

| | | | |
|---|---|---|---|
| 4,747,783 | * 5/1988 | Bellamy et al. ..................... 439/59 |
| 5,268,592 | * 12/1993 | Bellamy et al. ..................... 361/58 |
| 5,272,584 | * 12/1993 | Austruy et al. ..................... 361/58 |
| 5,644,731 | * 7/1997 | Liencres et al. .................... 395/283 |
| 5,729,062 | * 3/1998 | Satoh .................................. 361/58 |
| 5,898,844 | * 4/1999 | Thompson .......................... 361/58 |
| 5,909,065 | * 6/1999 | Jones et al. ........................ 307/147 |
| 6,038,615 | * 3/2000 | Yamada et al. .................... 710/103 |
| 6,102,742 | * 8/2000 | Daly .................................. 439/620 |
| 6,201,721 | * 3/2001 | Suranyi et al. .................... 307/147 |

\* cited by examiner

*Primary Examiner*—Fritz Fleming
(74) *Attorney, Agent, or Firm*—W. Daniel Swayze, Jr.; W. James Brady; Frederick J. Telecky, Jr.

(57) ABSTRACT

A hot swappable system includes a first system having an electrically conductive projection and a second system. The second system includes a voltage source having a first node having a first polarity, a resistive element, and a receptor system associated with the first node and configured to receive insertion of the conductive projection. The receptor system includes first and second conductive contacts electrically connected by the resistive element. The first conductive contact is disposed relative to the second conductive contact such that insertion of the conductive projection into the receptor system causes sequential electrical contact between the conductive projection and the first contact and then between the conductive projection and the second contact.

10 Claims, 2 Drawing Sheets

METHOD AND APPARATUS FOR REDUCING SOURCE VOLTAGE DEVIATION IN HOT PLUG APPLICATIONS

This application claims priority under 35 USC §119(e)(1) of the provisional application Ser. No. 60/159,500, filed Oct. 15, 1999.

TECHNICAL FIELD OF THE INVENTION

This invention relates generally to computer plug-ins and more particularly to a method and apparatus for reducing source voltage deviation in hot plug applications.

BACKGROUND OF THE INVENTION

Hot plug devices offer flexibility for adding function boards to a main system while the system is operating. Hot plug systems refer to systems that may receive additional plug-in devices without terminating power to the system.

A problem with hot plug systems is that input capacitors on the device to be plugged in, which is commonly referred to as a function board, draw a large amount of current from a voltage source located on the main system. This current is commonly referred to as in-rush current. A large current in-rush creates source voltage deviation, which is sometimes referred to as "undershoot." Undershoot may cause malfunctioning of the main system.

A prior method for addressing this problem utilizes an in-rush current limiter in series with the in-rush current. The in-rush current limiter is implemented by a negative temperature characteristic resistor. During hot plug-ins, the initial resistance of the negative temperature characteristic resistor is large, and the in-rush current generates heat in the resistor. This generated heat reduces the resistance of the negative temperature characteristic resistor to an operating resistance that is determined by the normal operating current. This method is somewhat suitable for low current applications. However, for high current applications, the operating resistance in the negative temperature characteristic resistor is too high and causes significant power loss. Furthermore, for either type of application, negative temperature characteristic resistors are expensive, increasing the cost of systems utilizing such resistors.

SUMMARY OF THE INVENTION

Accordingly, a need has arisen for an improved method and apparatus for reducing source voltage deviation in hot plug applications. The present invention provides an apparatus and method for reducing source voltage deviation in hot plug applications that address shortcomings of prior systems and methods.

According to one embodiment of the invention, a hot swappable system includes a first system having an electrically conductive projection and a second system. The second system includes a voltage source having a first node having a first polarity, a resistive element, and a receptor system associated with the first node and configured to receive insertion of the conductive projection. The receptor system includes first and second conductive contacts electrically connected by the resistive element. The first conductive contact is disposed relative to the second conductive contact such that insertion of the conductive projection into the receptor system causes sequential electrical contact between the conductive projection and the first contact and then between the conductive projection and the second contact.

According to another embodiment of the invention, a method for connecting a plug-in device having a conductive projection to a base system to reduce deviation of a source voltage on the base system includes providing first, second, and third electrical contacts on the base system. The method also includes providing a voltage source between the second electrical contact and the third electrical contact. A resistive element is connected between the first and second electrical contacts and the conductive projection is electrically connected to the first electrical contact such that the current flows from the voltage source to the resistor to the conductive projection. After electrically connecting the conductive projection to the first electrical contact, the conductive projection is electrically connected to the second electrical contact such that the current flows from the voltage source through the second electrical contact to the conductive projection but that no substantial current flows from the voltage source through the resistor to the conductive projection.

Embodiments of the invention provide numerous technical advantages. For example, in one embodiment of the invention, the in-rush current due to hot plug in of a function board is substantially reduced resulting in substantially reduced source voltage deviation. Reduced source voltage deviation leads to more reliable operation of the main system. These advantages may be realized in some embodiments with only minor cost increases to systems incorporating the teachings of the present invention.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 1:
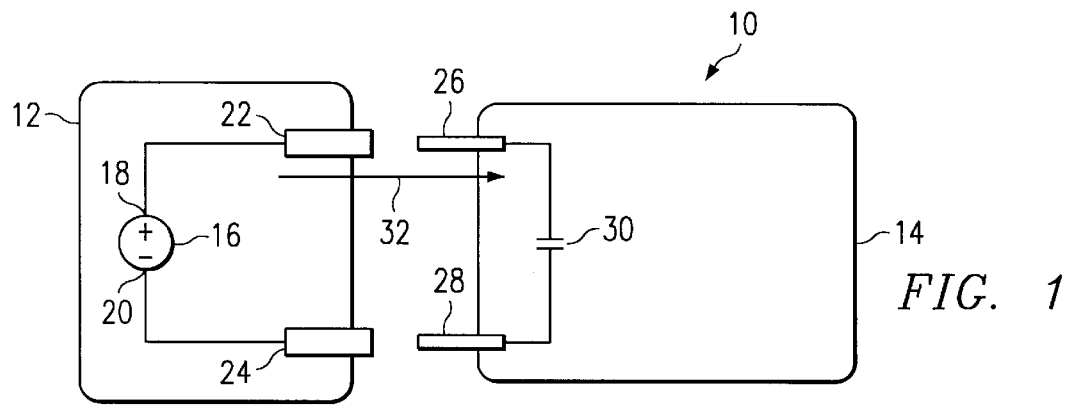
FIG. 1 is a circuit diagram illustrating the joining of an auxiliary system, such as a function board, with a base system through a hot plug technique.

FIG. 1 is a circuit diagram illustrating the joining of a auxiliary system with a base system through a hot plug technique. System 10 includes a base system 12 and a auxiliary system 14. Auxiliary system 14 is plugged into base system 10 to provide greater functionality to base system 12. In this example, base system 12 is a digital signal processor; however, base system 12 may be any apparatus that performs a function and that may be coupled with auxiliary system 14. An additional example of base system 12 includes a USB hub. In this example, auxiliary system 14 is a function board; however, auxiliary system 14 may be any device that may be plugged into base system 12 to provide additional functionality or other uses. Additional examples of auxiliary system 14 include a mouse or similar input device.

Base system 12 includes a voltage source 16. In the illustrated embodiment, voltage source 16 has a node 18 having a positive polarity and a node 20 having a negative polarity. Node 18 is associated with a socket 22 on base system 12, and node 20 is associated with a socket 24 on base system 12. Sockets 22 and 24 provide an electrical connection with which auxiliary system 14 may make contact.

Auxiliary system 14 includes a pin 26 and a pin 28. Pin 26 and pin 28 provide an electrical connection with which base system 12 may make contact. Although sockets 22 and 24 and pins 26 and 28 have been particularly described, it should be understood that pins, or similar connections, may be formed on base system 12 and sockets, or similar connections, may be found on auxiliary system 14. Alternatively, combinations of each of these types of connections may be found on both base system 12 or auxiliary system 14. An input capacitance 30 is maintained between pins 26 and 28.

Electrical connection between base system 12 and auxiliary system 14 is made by inserting pins 26 and 28 into sockets 22 and 24, respectively. Socket 22 is sized and configured to receive pin 26, and socket 24 is sized and configured to receive pin 28. Sockets 22 and 24 comprise an electrically conductive material to provide electrical current from voltage source 16 to auxiliary system 14 through use of pins 26 and 28.

If auxiliary system 14 is connected to base system 12 while voltage source 20 maintains a non-zero voltage, the connection is referred to as a hot plug-in. During a hot plug-in, the input capacitance 30 draws a large current from voltage source 20 on base system 12 as indicated by reference numeral 32. This large current draw results from a relatively low resistance between voltage source 16 and the capacitance 30. This current is referred to as an in-rush current. A large in-rush current 32 may cause source voltage deviation in voltage source 12, which is referred to as undershoot. A large undershoot may cause malfunctioning of base system 12. An example of such malfunctioning is latching-up of voltage source 20.

Figure 2:
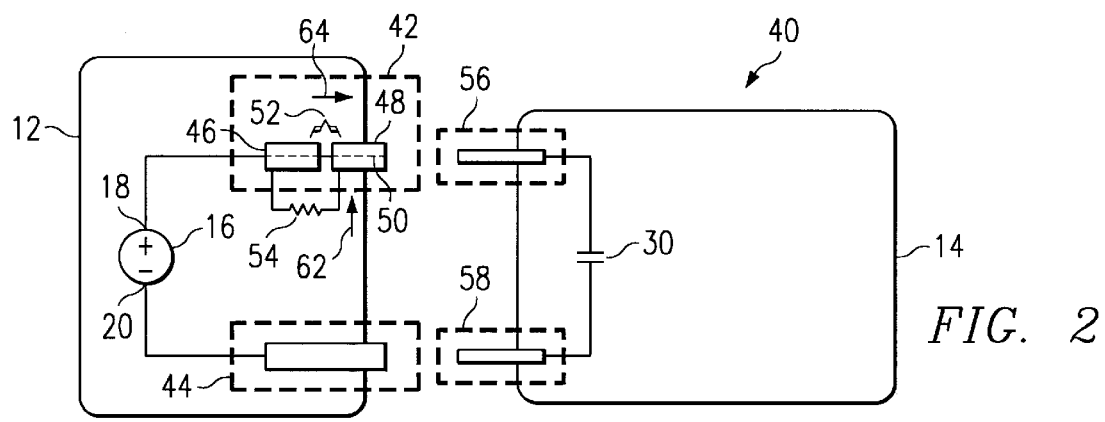
FIG. 2 is a circuit diagram illustrating the joining of an auxiliary system, such as a function board, with a base system incorporating an additional socket according to the teachings of the present invention using a hot plug technique.
Figure 3:
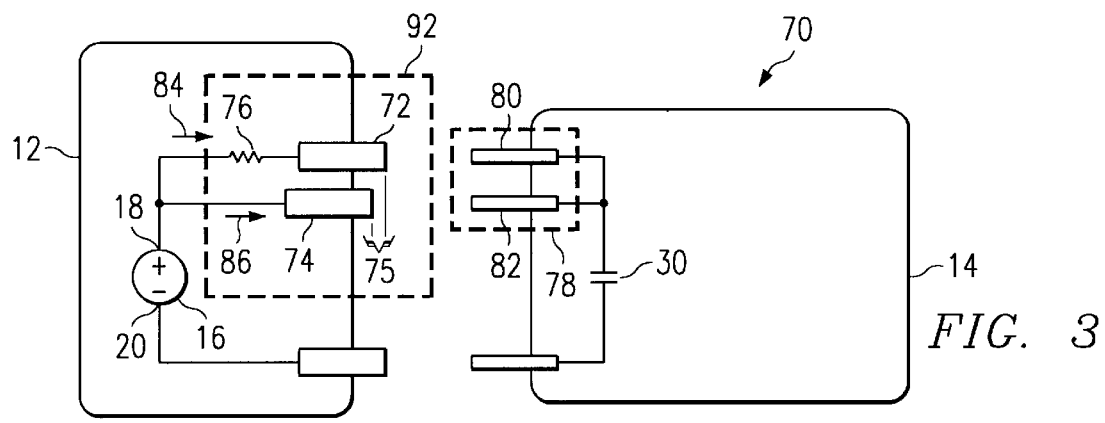
FIG. 3 is a circuit diagram illustrating the joining of an auxiliary system, such as a function board, with a base system according to another embodiment of the invention utilizing a hot plug technique.

According to the teachings of the present invention, the in-rush current is limited during hot plug-in by providing suitable circuitry that limits the in-rush current during hot plug-in, but that does not introduce substantial power loss into system 10 during normal operation. FIGS. 2 and 3 provide two circuits for implementing the teachings of the present invention.

FIG. 2 is a circuit diagram illustrating the joining of auxiliary system 14 with base system 12 incorporating an additional socket according to the teachings of the present invention using a hot plug technique. System 40 includes many of the elements described in FIG. 1. For simplicity of description, the same reference numerals will be used for common elements. Thus, system 40 includes a base system 12, an auxiliary system 14, and a voltage source 16 having nodes 18 and 20. In addition, in this embodiment, base system 12 includes a receptor system 42 and a receptor system 44. Receptor system 44 is implemented in this embodiment by a socket; however, other suitable implementations of receptor system may be used, such as other types of electrical contacts. In this embodiment, receptor system 42 includes electrical contact 46 and electrical contact 48. Electrical contacts 46 and 48 are implemented in this embodiment by electrical sockets; however, other suitable electrical contacts may be utilized. Electrical contacts 46 and 48 are oriented along a common axis 50, and are separated by a gap 52. In this embodiment, sockets 46 and 48 are two shorter sockets that replace a conventional longer socket, such as socket 22; however, other configurations may be used. A resistive element 54 connects electrical contacts 46 and 48. In this embodiment, resistive element 54 is implemented by a single resistor; however, other suitable implementations of resistive element 54 may be used.

Auxiliary system 14 includes a conductive projection 56 and a conductive projection 58. Conductive projections 56 and 58 are implemented in this embodiment as pins; however, other suitable implementations of conductive projections 56 and 58 may be used.

Auxiliary system 14 is coupled to base system 12 by inserting conductive projection 56 into receptor system 50 and conductive projection 58 into receptor system 44. When conductive projection 56 is inserted into receptor system 50, conductive projection 56 first contacts socket 48, and conductive projection 58 contacts socket 44. These connections create a circuit that causes an in-rush current 62 to flow through resistive element 54. Resistive element 54 reduces the magnitude of in-rush current 62, which reduces the source voltage deviation in voltage source 16.

While in-rush current 62 flows through resistive element 54, input capacitance 30 is charged. When auxiliary system 40 is further inserted into a system, conductive projection 56 contacts socket 46. This connection causes current 64 to flow from voltage source 16 through electrical sockets 46 and 48, through conductive projection 56 to auxiliary system 14. However, current 64 does not flow through resistor 62 because resistor 62 is shorted by the electrical connection between conductive projection 56 and socket 46. The magnitude of current 64 during plug-in is lower than would otherwise occur because input capacitance 30 has been changed to some extent. Thus, normal operation after complete hot plug-in of auxiliary system 14 into base system 12 is not affected by power losses associated with the current flow through resistive element 62. Thus, source voltage deviation is reduced during hot plug-in without resulting in power losses during normal operation.

Although a particular embodiment in which voltage source 16 was located on base system 12 has been described, the teachings of the invention apply also to systems in which a voltage source is located on auxiliary system 14. In addition, the teachings of the present invention are also applicable to systems that utilize receptor systems on auxiliary system 14 and conductive projections on base system 12, combinations of each on each system, or other suitable configurations.

FIG. 3 is a circuit diagram illustrating the joining of an auxiliary system with a base system according to another embodiment of the invention utilizing a hot plug technique. System 70 is in many respects analogous to system 40 described in FIG. 2. In this embodiment, however, a receptor system 92 includes a conductive contact 72 and a conductive element 74 connected by a resistive element 76. In this embodiment, conductive element 72 and 74 are implemented as sockets; however, other suitable electrical contacts may be used. Auxiliary system 14 includes a conductive projection 78 that includes a pair of pins 80 and 82.

As illustrated, receptor system 42 is formed with socket 74 recessed from socket 72 a gap 75 such that when conductive projection 78 is inserted into receptor system 42, pin 80 electrically contacts socket 72 prior to pin 82 electrically contacting socket 74. Therefore, when pin 80 first contacts socket 72, an in-rush current 84 flows from a voltage source 16 through resistor 76, through socket 72, and through pin 80 to auxiliary system 14. When pin 82 electrically contacts socket 74, resistive element 76 is shorted and a current 86 flows from voltage source 16, through socket 74, and through pin 82 to auxiliary system 14. Therefore, the magnitude of in-rush current 84 is reduced by flow through resistive element 76, and once auxiliary system 14 is completely plugged in, current flow during normal operation is substantially unaffected by resistive element 76, resulting in little or no power loss. Once current flow 86 is initiated through socket 74, inrush current is reduced due to the charging of input capacitance 30 that has occurred from current 84. The magnitude of resistance element 76 and size at gap 75 may be adjusted to provide suitably small in-rush currents 84 and 86.

Thus, by providing a resistive element through which the in-rush current may flow during plug-in, but through which current does not flow during normal operation, in-rush current may be maintained at acceptable levels. Maintaining in-rush current at acceptable levels results in reduced source voltage deviation, which results in better operation of the base system. Furthermore, by providing a resistor through which no substantial current flows during normal operation, little or no power loss is introduced in the resulting system.

Figure 4:
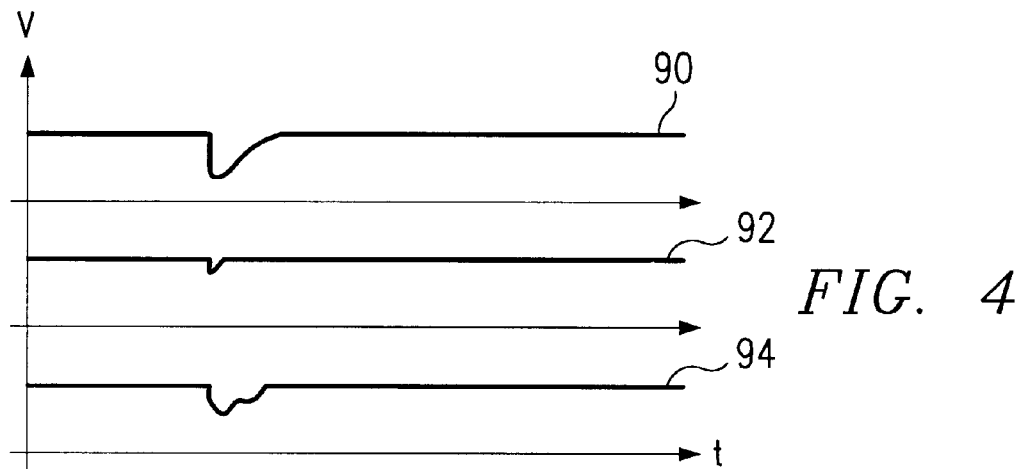
FIG. 4 is a series of graphs illustrating theoretical source voltage wave forms for the circuits of FIGS. 1 through 3.

FIG. 4 is a series of graphs illustrating theoretical source voltage wave forms for the circuits of FIGS. 1 through 3.

Waveform 90 displays the effect of in-rush current on source voltage with conventional implementations. As illustrated, a significant deviation in the source voltage is incurred. Waveform 92 illustrates the effect of a system according to the present invention with a sufficiently large gap 52 and sufficiently small resistance element 54. In such a configuration, there is enough time for the input capacitance 30 to charge up to the source voltage provided by voltage source 16 before conductive projection 56 touches socket 46. If gap 52 is not large enough, or resistive element is too large, input capacitance 30 is not charged up to the source voltage when conductive projection 56 contacts socket 46. The voltage difference between voltage source 16 and the charged voltage across input capacitance 30 causes a second voltage drop in source voltage 16 when conductive projection 56 is completely inserted into receptor system 42. This effect is illustrated by curve 94. The particular values for resistive element 54 and gap 52 may be adjusted according to desired parameters and particular implementations. Similarly, resistive element 76 and gap 75 may be optimized according to particular implementations and conditions.

Figure 5:
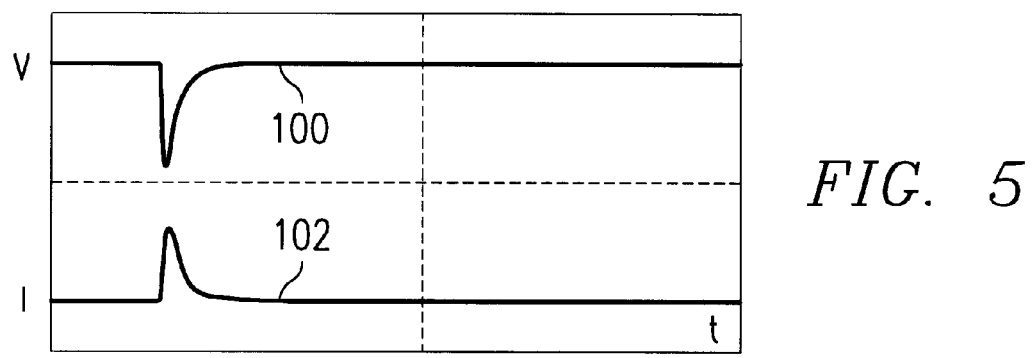
FIG. 5 is a graph of test results for the circuit of FIG. 1, showing voltage and current over time.

FIG. 5 is a graph of test results for the system of FIG. 1, showing voltage and current over time. Curve 100 illustrates the voltage generated by voltage source 16 over time as auxiliary system 14 is inserted into base system 12, and curve 102 illustrates current 32 over time as auxiliary system 14 is inserted into base system 12. As demonstrated by curve 102, with a conventional implementation, the in-rush current 32 reaches a maximum value at approximately 10 amps (units not explicitly illustrated in FIG. 5), and the associated voltage drop in the voltage produced by voltage source 16 is approximately 2 volts. In contrast, the results illustrated in FIG. 6 for similar circuits but utilizing the implementation of FIG. 2 demonstrates a significantly improved result.

Figure 6:
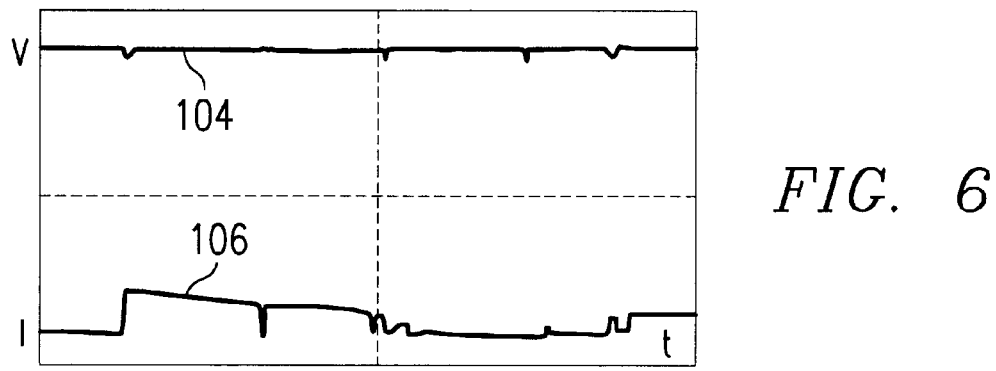
FIG. 6 is a graph showing test results for the circuit of FIG. 2, showing voltage and current over time.

FIG. 6 is a graph showing test results for the system of FIG. 2, showing voltage and current over time. Curve 104 illustrates the voltage generated by voltage source 16 during plug-in of auxiliary system 14 into base system 12, and curve 106 illustrates the current. 62, 64 flowing from voltage source 16 to auxiliary system 14 during plug-in of auxiliary system 14 into base system 12. The in-rush current 62, 64 reaches a maximum value of only approximately 1 amp, and the associated voltage drop for the voltage generated by voltage source 16 is only about 0.25 volts (units not explicitly illustrated in FIG. 6). Therefore, significant advantages are achieved utilizing the illustrated structure. These advantages result in a hot plug-in system with reduced likelihood of malfunctioning. In this test case, voltage source 16 generated a voltage of 5 volts, gap 52 was 0.125 inches, resistance element 54 had a value of 4 ohms, and input capacitance 30 had a value of 220 micro farads.

Although the present invention and its advantages have been described in detail, it should be understood that various changes, substitutions, and alterations can be made therein without departing from the spirit and scope of the present invention as defined by the appended claims.

What is claimed is:

1. A hot swappable system comprising:
   a first system having an electrically conductive projection; and
   a second system comprising:
      a voltage source having a first node having a first polarity;
      a resistive element; and
      a receptor system associated with the first node and configured to receive insertion of the conductive projection, the receptor system comprising first and second conductive contacts electrically connected by the resistive element, the first conductive contact disposed relative to the second conductive contact such that insertion of the conductive projection into the receptor system causes sequential electrical contact between the conductive projection and the first contact and then between the conductive projection and the second contact;
   wherein the first conductive contact comprises a first socket and the second conductive contact comprises a second contact and the receptor system is formed with the first and second contacts aligned along a common axis with a gap disposed between the first and second sockets along the common axis.

2. The system of claim 1, wherein the resistive element connects the first and second contacts in series relative to the conductive projection.

3. The system of claim 1, wherein the electrically conductive projection comprises a pair of pins.

4. The system of claim 3, wherein the first and second electrical contacts are configured to receive the respective pins of the pair of pins.

5. The system of claim 3, wherein the first and second electrical contacts are further configured to receive the first pin prior to the reception of the second pin by the second socket.

6. The system of claim 5, wherein the first and second contacts are connected by the resistive element in parallel relative to the pins.

7. The system of claim 1, wherein the second system further comprises a voltage source having a first node, the first node associated with the receptor system.

8. The system of claim 1, wherein the first system further comprises a voltage source having a first node having a first polarity, the first node associated with the electrically conductive projection.

9. An apparatus for receiving a function board, the function board comprising an electrically conductive projection, the apparatus comprising:

a voltage source having a first node having a first polarity;

a socket system having first and second sockets for receiving the conductive projection;

a resistance element connected between the first and second sockets;

wherein the socket system is formed with the first and second sockets located to sequentially electrically contact the conductive projection when the function board is received within the apparatus; and wherein the socket system is formed with the first and second socket oriented along a common longitudinal axis and with a gap disposed between the first and second sockets such that, upon insertion of the conductive projection into the socket system, the conductive projection sequentially electrically contacts the first socket and then the second socket.

10. The apparatus of claim 9, wherein the resistance element is connected in parallel between the first and second sockets.

* * * * *